United States Patent [19]

Lazarevich

[11] Patent Number: 4,971,385
[45] Date of Patent: Nov. 20, 1990

[54] MOLDING TRANSITION BLOCK FOR MOTOR VEHICLES

[75] Inventor: Robert R. Lazarevich, Rochester, Mich.

[73] Assignee: Chrysler Corporation, Highland Park, Mich.

[21] Appl. No.: 452,448

[22] Filed: Dec. 18, 1989

[51] Int. Cl.⁵ .............................................. B60R 7/04
[52] U.S. Cl. ..................................................... 296/136
[58] Field of Search .......................................... 296/136

[56] References Cited

U.S. PATENT DOCUMENTS

| | | | |
|---|---|---|---|
| 4,600,233 | 7/1986 | Boyston | 296/136 |
| 4,668,006 | 5/1987 | Wagner | 296/136 |
| 4,669,774 | 6/1987 | Crain | 296/136 |
| 4,679,844 | 7/1987 | Wolford | 296/136 |

Primary Examiner—Robert R. Song
Attorney, Agent, or Firm—Edward P. Barthel

[57] ABSTRACT

A convertible body structure includes a spaced juncture defined by the forward edge of the upstanding body flange molding surrounding the flexible top storage tonneau and the forward edge of the quarter belt molding. A readily installed molding transitioln block is provided which insures vertical height alignment of the adjustable tonneau cover peripheral trim member with the belt molding. The transition block also insures "cross car" alignment between the moldings together with an external arcuate sealing surface for mating contact with an internal seal on the tonneau cover trim member.

1 Claim, 2 Drawing Sheets

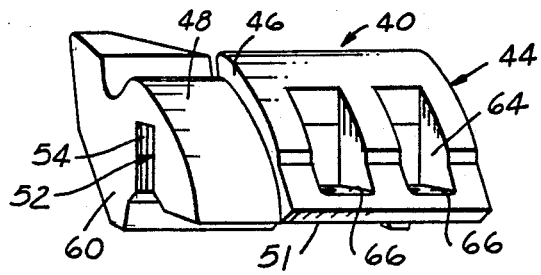
FIG.6
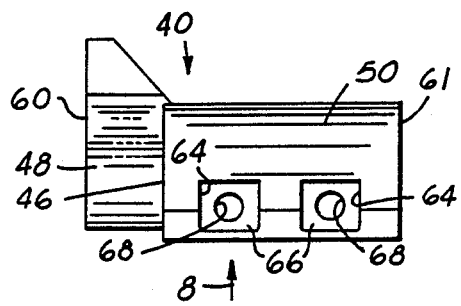
FIG.7
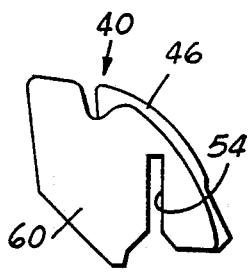
FIG.9
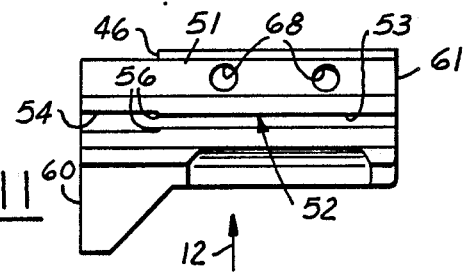
FIG.8
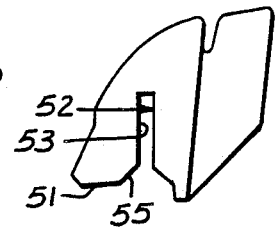
FIG.10
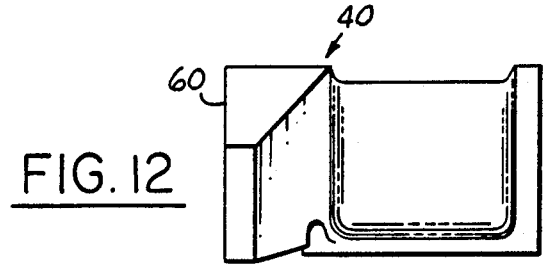
FIG.11
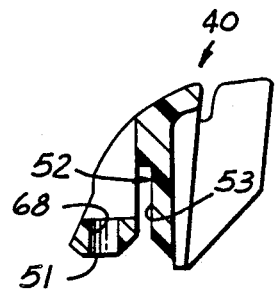
FIG.13
FIG.12

MOLDING TRANSITION BLOCK FOR MOTOR VEHICLES

BACKGROUND OF THE INVENTION

This invention relates to an orienting and locating molding block for automobile moldings and more particularly pertains to a molding transition block adapted to span the spaced juncture between a belt molding and a pinch weld flange molding of a convertible automobile body.

Convertible automobiles generally have a closed storage cavity or "tonneau" aft of the rear seat (aft of the rear storage compartment in two-seat cockpit models), for receiving and storing the folded top when it is lowered. A flexible cover or "boot" for enclosing the tonneau and giving a "finished" appearance to the vehicle has long been provided. Reference may be made to U.S. Pat. No. 4,679,844 issued July 14, 1987 to Wolford et al. which discloses such a convertible boot.

It has recently become popular to provide a rigid tonneau cover for convertibles formed from sheet metal or the like which is stamped into shape. The tonneau cover is hinged for rotation about an aft transverse pivot axis between an upwardly pivoted open position for raising and lowering the top and a lowered closed position. In its closed position the tonneau cover provides an outer painted surface adapted to closely conform in appearance with the body skin of the vehicle. An upstanding continuous pinch-weld body flange borders the aft and side portions of the storage tonneau and extends forwardly to the side door openings on either side of the car. A U-shaped pinch-weld body flange molding encloses the body flange with the flange molding adapted to mate, in a coextensive manner, with an overlying tonneau cover peripheral trim strip. In prior art constructions the body flange molding longitudinally extending side portions and matching tonneau cover trim strip terminate in a longitudinally spaced manner with the associated aft end of the body quarter belt molding.

SUMMARY OF THE INVENTION

It is an object of the present invention to provide a molding transition block to bridge the juncture of the belt molding with upstanding body flange molding and its overlying tonneau cover sealing trim strip of a convertible vehicle.

It is another object of the present invention to provide a molding transition block as set forth above which insures vertical height alignment of the tonneau cover sealing trim strip and the belt molding.

It is still another object of present invention to provide a molding transition block as set forth above which insures cross-car alignment between each side belt molding and its associated tonneau cover trim strip.

It is a further object of the present invention to provide a molding transition block as set forth above which insures rotational orientation of the tonneau cover trim strip while avoiding interference between the convertible top and the transition block.

It is yet another object of the present invention to provide a molding transition block a set forth above which provides a sight shield to the tonneau cavity.

The present invention provides for a quick and easy to use molding transition block for a convertible automobile storage tonneau cover. The block bridges the interrupted juncture defined by the forward edge of the upstanding body flange welt molding and its overlying tonneau cover trim strip surrounding the storage tonneau area with the aft edge of their associated belt molding.

BRIEF DESCRIPTION OF THE DRAWINGS

The foregoing, and other objects and advantages of the present invention will become more apparent from the following detailed description when considered with the accompanying drawings, wherein:

FIG. 6 is an enlarged perspective detail view of the molding transition block

FIG. 7 is a top elevational view of the molding transition block of FIG. 6;

FIG. 8 is an outboard side elevational view of the molding transition block of FIG. 6;

FIG. 9 is an end elevational view taken in the direction of arrow "FIG. 9" in FIG. 8;

FIG. 10 is an end elevational view taken in the direction of arrow "FIG. 10" in FIG. 8;

FIG. 11 is a bottom elevational view taken in the direction of arrow "FIG. 11" in FIG. 8;

FIG. 12 is an inboard side elevational view taken in the direction of arrow "FIG. 12" in FIG. 8; and FIG. 13 is a vertical sectional view taken on the line 13—13 of FIG. 8.

Detailed Description Of The Invention

Figure 1:
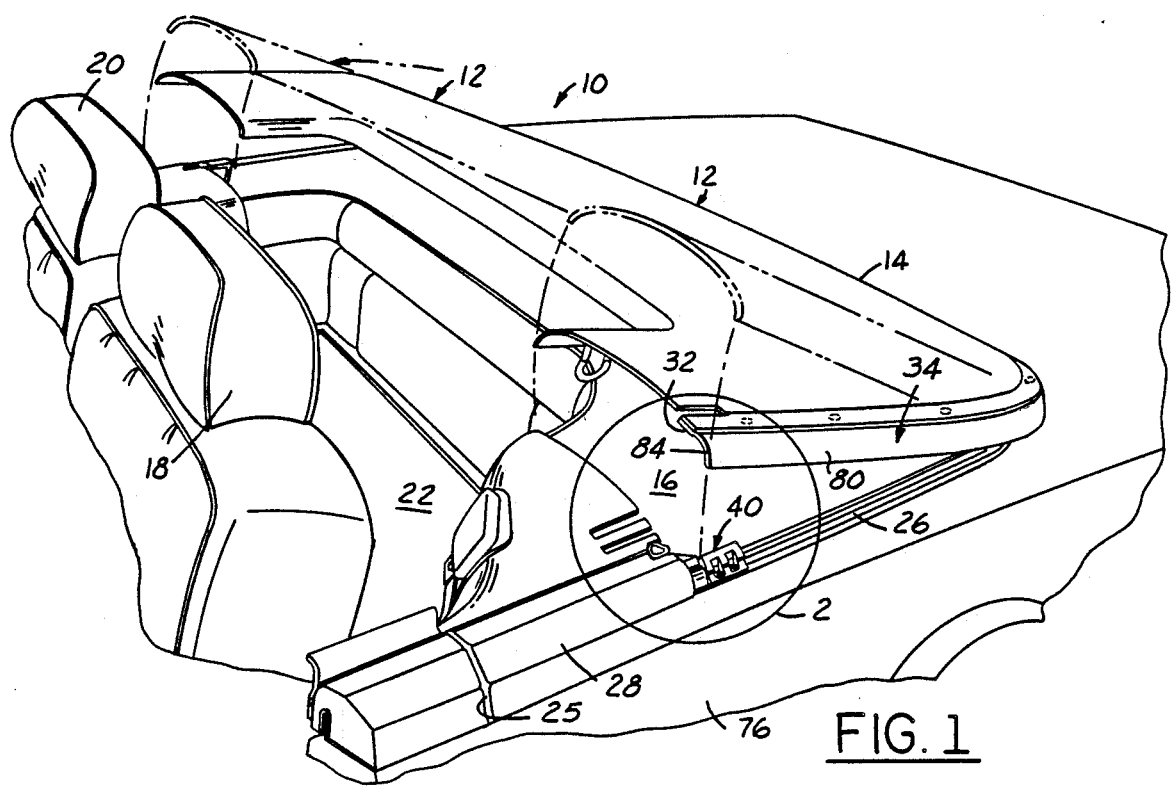
FIG. 1 is a fragmentary perspective view of a convertible vehicle with its hinged rigid tonneau cover in its partially open position showing the molding transition block of the present invention.

To simplify the following description, the components on only one side of the vehicle body are described, except where otherwise noted, and similar components on the opposite side are designated by like reference numerals.

Figure 2:
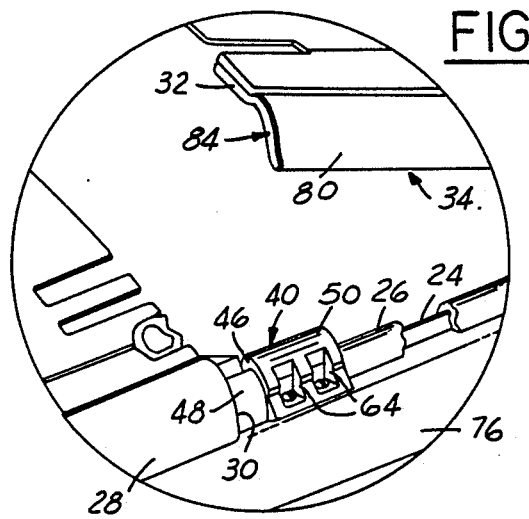
FIG. 2 is an enlarged perspective view of the molding transition block and adjacent structure enclosed in the circle delineated "FIG. 2" in FIG. 1.
Figure 3:
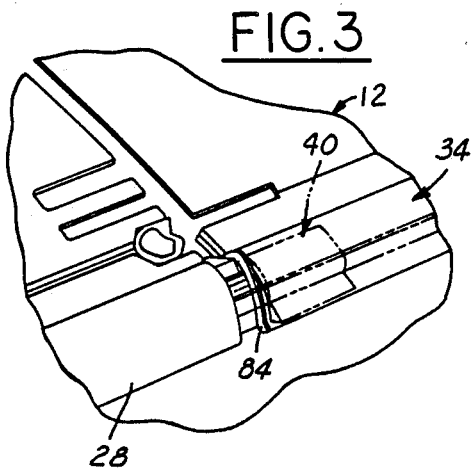
FIG. 3 is a view similar to FIG. 2 showing the tonneau rigid cover in its closed position.
Figure 4:
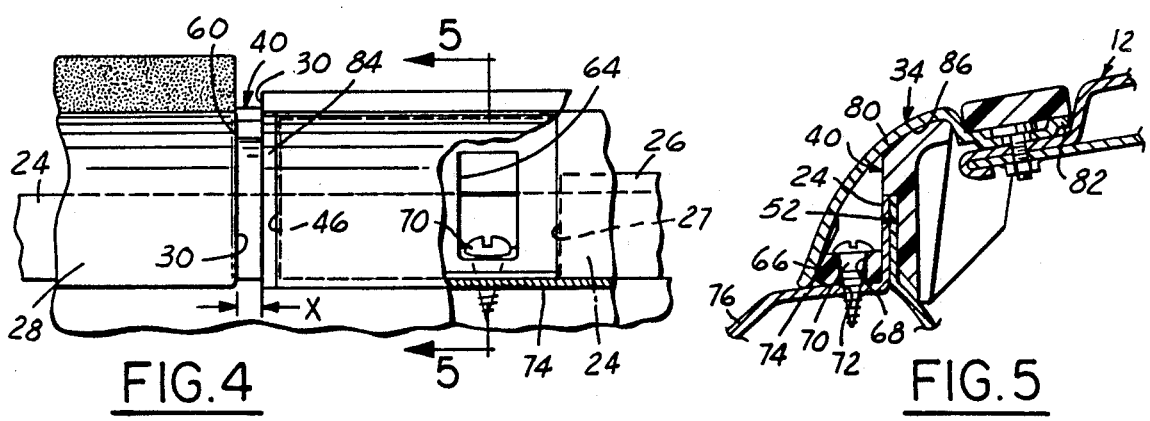
FIG. 4 is a side elevational view of the molding transition block and adjacent structure shown in FIG. 3.

Referring now to FIG. 1 of the drawings, an intermediate rear portion of a convertible vehicle body 10 is illustrated showing a rigid tonneau cover 12 connected to the body 10 by suitable hinge means (not shown) for swinging movement about a transverse pivot axis adjacent aft edge 14 of the cover 12. The rigid tonneau cover 12, which is formed from suitable material such as stamped sheet metal, is adapted to overlie a flexible convertible top receiving well-like storage chamber or tonneau 16. A pair of side-by-side driver and passenger front seats 18 and 20, respectively are located in the vehicle two-seater cockpit. The tonneau 16 extends transversely of the vehicle body between a rear compartment 22, aft of the seats 18,20 and an upstanding pinch-weld body flange shown at 24 in FIG. 2. The upstanding body flange 24 extends continuously between each side door rear jam 25 (FIG. (1) and loops the sides and rear of the tonneau 16. The body flange 24 is concealed by an inverted U-shaped body flange welt 26 as seen in FIG. 2. FIG. 4 shows the welt 26 positioned on the upstanding flange 24 having its forward or leading vertical edge indicated by dashed line 27.

A quarter belt molding is shown in FIG. 1 at 28 and extends longitudinally along the upper sides of the vehicle rear compartment 22. With reference to FIG. 4 it will be seen that aft or trailing vertical edge 30 of the quarter belt molding 28 terminates a determined first longitudinal distance "X" from transverse leading edge 32 of tonneau cover peripheral trim strip 34.

Turning now to the instant invention, FIGS. 1, 2 and 6 show a left hand molding transition block, generally indicated at 40, which is formed from a suitable plastic material. The right hand block 40 is a mirror image of the left hand block and thus only the left hand block will be described in detail.

FIG. 6 shows the one-piece block 40, molded from a suitable plastic material, formed generally into a forward portion 42 and an aft portion 44 with the portions 42 and 44 delineated by a vertically oriented exterior shoulder 46. As seen in FIG. 6 the exterior shoulder 46 separates forward and aft outboard facing convex curved or arcuate complementary surfaces 48 and 50, respectively, with the forward arcuate surface 48 being offset inboard and downwardly from the aft arcuate surface 50.

In FIGS. 9, 10, and 11 it will be seen that the transition block 40 bottom surface 51 is formed with a longitudinally extending vertically disposed continuous medial slot 52. The aft portion of the slot is defined by a pair of parallel aft interior walls 53. The forward end of the medial slot is defined by a pair of parallel forward interior walls 54 spaced apart a predetermined distance greater than the pair of parallel aft interior walls 53. It will be appreciated with reference to FIGS. 8 and 11 that a pair of interior shoulders 56, separating the aft pair of walls 53 from the forward pair of walls 54, are located in the plane of the exterior shoulder 46. The wider forward portion of the slot defined by the walls 54 allows for any over tolerance thickness of the forward portion of the body flange 24. In FIG. 10 it will be seen that the medial slot 52 is formed with lead-in beveled edges 55 for ease of assembly.

Figure 5:
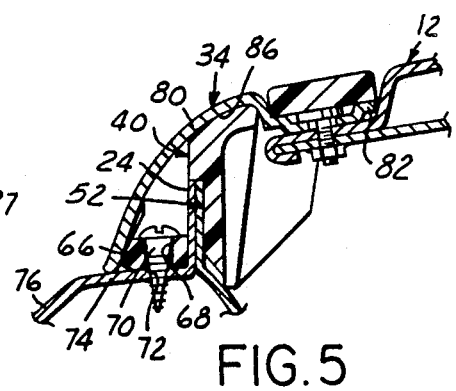
FIG. 5 is a vertical sectional view taken on line 5—5 of FIG. 4.

As seen in FIG. 4 the transition block 40 is uniquely designed to extend longitudinally between the leading edge 27 of the welt 26 and the trailing edge 30 of the belt molding 28. It will be noted in FIGS. 4 and 5 that upon the upstanding body flange 24 portion extending through the gap between the welt edge 27 and the belt molding edge 30. The flange 24 is adapted to be received in the transition block medial slot 52 such that forward end face 60 of the block is juxtaposed the aft edge 30 of the quarter belt molding 28 while the trailing face 61 is juxtaposed the forward edge 27 of the welt 26. The block aft arcuate surface 50 is formed with a pair of side-by-side identical notched recesses 64. FIGS. 6, 7, and 8 show each recesses 64 defined by a horizontal base portion 66 having a through bore 68 therein. As seen in FIGS. 4 and 5 a metal screw 70 is located in each of the bores 68 and is threaded into an aligned hole 72 in a underlying sloped portion 74 of body sheet metal side panel 76.

With reference to FIGS. 2 and 5 it will be seen that the edge molding trim 34 comprises an outboard arcuate concavo-convex section 80 and an inboard mounting strip 82. The forward end of the trim section 80 terminates in an arcuate end cap 84 which conforms to the section 80 but defines a larger dimension such that the end cap 84 projects inboard a determined dimension from inner surface 86 of the molding section 80 substantially equal to the offset dimension of the block shoulder 46 as best seen in FIG. 6. Thus, the endcap 84 is adapted to be supported in a nesting manner on the block forward arcuate surface portion 48.

It is understood that the invention is not limited to the exact construction and operating arrangement illustrated and described above but that various changes and modifications may be made without departing from the spirit and scope of the invention as defined in the following claims.

What Is Claimed Is:

1. A molding transition block for a convertible automobile body upstanding flange bordering a storage tonneau of the automobile, a cover member is provided for normally concealing the tonneau, said cover member having a peripheral edge trim member comprising an outboard arcuate fascia section adapted to overlie at least a portion of said upstanding flange and an inboard mounting strip, said cover edge trim member mounting strip being secured to said cover by threaded fastener means extending through aligned apertures in said cover and said mounting strip, said mounting strip apertures being oversized whereby said edge trim member being adjustable relative to said cover prior to being positively retained by said threaded fastener means, body belt molding positioned on said upstanding flange forward of said tonneau with said belt molding having an aft vertical edge, and said edge trim member leading edge having an enlarged conforming end-cap portion secured thereto, said molding transition block comprising:

a one-piece plastic block having a forward portion and an aft portion, said forward portion terminating in a transversely disposed forward end face, said block formed with a longitudinally extending vertically disposed open ended medial mounting slot coextensive therewith sized to snugly receive the upstanding flange therein;

said block forward portion having an outboard forward convex arcuate surface and said block rearward portion having an outboard aft convex arcuate surface with said forward arcuate surface being offset inwardly a predetermined dimension from said aft arcuate surface so as to define a vertically extending shoulder therebetween;

said block aft arcuate surface formed with a plurality of notched recesses therein, each said recess defined by a horizontal base having a vertically disposed bore therethrough adapted to receive a metal screw, such that with said block medial mounting slot receiving said upstanding flange and said block forward end face contacting said body belt molding aft vertical edge one of said metal screws extending through each said notched recess bore into threaded engagement with said body;

whereby with said cover closing said tonneau said edge trim member outboard arcuate section adapted to be transversely adjustably positioned in an overlying juxtaposed sealed manner on said block aft portion arcuate surface for subsequent positive securing of said edge trim member by said threaded fastener means; and whereby said edge trim member enlarged end-cap portion adapted to be positioned in an overlying conforming manner on said block forward offset arcuate surface such that said edge trim member outboard section is in substantial conformity with said body side molding.

* * * * *